US010207871B2

(12) United States Patent
Issing

(10) Patent No.: US 10,207,871 B2
(45) Date of Patent: Feb. 19, 2019

(54) STORAGE AND ORDER-PICKING SYSTEM

(71) Applicant: SSI Schäfer Automation GmbH (DE), Giebelstadt (DE)

(72) Inventor: Elmar Issing, Giebelstadt (DE)

(73) Assignee: SSI Schäfer Automation GmbH (DE), Giebelstadt (DE)

( * ) Notice: Subject to any disclaimer, the term of this patent is extended or adjusted under 35 U.S.C. 154(b) by 0 days.

(21) Appl. No.: 15/905,985

(22) Filed: Feb. 27, 2018

(65) Prior Publication Data

US 2018/0186572 A1 Jul. 5, 2018

Related U.S. Application Data

(63) Continuation of application No. PCT/EP2016/069382, filed on Aug. 16, 2016.

(30) Foreign Application Priority Data

Aug. 28, 2015 (DE) .................. 10 2015 114 393

(51) Int. Cl.
*G06F 7/00* (2006.01)
*B65G 1/137* (2006.01)
(52) U.S. Cl.
CPC ......... *B65G 1/1378* (2013.01); *B65G 1/1375* (2013.01); *B65G 2209/06* (2013.01)
(58) Field of Classification Search
None
See application file for complete search history.

(56) References Cited

U.S. PATENT DOCUMENTS 8,965,562 B1 2/2015 Wurman et al.
9,725,241 B2 8/2017 Swinkels et al.
(Continued)

FOREIGN PATENT DOCUMENTS

DE 10 2008 039764 A1 5/2010
DE 10 2012 016522 A1 3/2013
(Continued)

OTHER PUBLICATIONS

International Search Report for corresponding Patent Application No. PCT/EP2016/069382 dated Dec. 8, 2016.
(Continued)

*Primary Examiner* — Yolanda R Cumbess
(74) *Attorney, Agent, or Firm* — Renner, Otto, Boisselle & Sklar, LLP

(57) ABSTRACT

It is disclosed a method (70) for operating a storage and order-picking system (10) in which a plurality of manipulators (40) process a plurality of picking/storing orders in accordance with a manipulator-to-handling-unit principle, wherein the system (10) comprises a provision zone (12), a picking zone (14), a plurality of provision units (42, 62) in the provision zone, a plurality of, particularly stationary arranged, transfer locations (46) in the picking zone (14), a DTS (18) including a plurality of DTVs (20), and a controlling device (32), and wherein the method (70) comprises the following steps of: analyzing (S10) the plurality of picking/storing orders by the controlling device (32) for determining retrieval/delivery locations in the provision zone (12); setting (S12) of transfer actions (48) by selecting for each of the retrieval/delivery locations one or more of the transfer locations (46) in the picking zone (14) as delivery/retrieval location and by assigning the same thereto, wherein the delivery/retrieval location is located within an action zone (72) extending around the respective retrieval/delivery
(Continued)

location and moving dynamically with the respective manipulator (40); generating (S14) an action order for each of the manipulators (40) by selecting some of the transfer actions (48), and setting a, particularly unidirectional, moving path (74) along which the respective manipulator (40) moves between the selected retrieval/delivery locations throughout the, preferably entire, picking zone (14); and generating (S16) transport orders for the DTVs (20) so that each of the manipulators (40), during performance of its action order, can perform its transfer actions (48) within its action zone (72), preferably without interruption.

21 Claims, 8 Drawing Sheets

(56) References Cited

U.S. PATENT DOCUMENTS

| | | |
|---|---|---|
| 2002/0008723 A1 | 7/2002 | Lewis et al. |
| 2005/0238465 A1* | 10/2005 | Razumov ............... A47F 10/02 |
| | | 414/273 |
| 2008/0167884 A1 | 7/2008 | Mountz et al. |
| 2012/0101627 A1* | 4/2012 | Lert ..................... B65G 1/1378 |
| | | 700/216 |
| 2012/0330458 A1 | 12/2012 | Weiss |
| 2013/0103552 A1 | 4/2013 | Hoffman et al. |
| 2013/0317642 A1 | 11/2013 | Asaria et al. |
| 2014/0100999 A1 | 4/2014 | Mountz et al. |
| 2014/0288696 A1 | 9/2014 | Lert |
| 2015/0332213 A1* | 11/2015 | Galluzzo ................. B25J 5/007 |
| | | 700/216 |
| 2016/0016311 A1* | 1/2016 | Konolige ................. B25J 5/007 |
| | | 700/245 |
| 2016/0167880 A1* | 6/2016 | Pankratov ............ B65G 1/0492 |
| | | 414/281 |
| 2016/0229631 A1 | 8/2016 | Kimura et al. |
| 2017/0166399 A1* | 6/2017 | Stubbs .................. B25J 9/0096 |
| 2018/0141211 A1* | 5/2018 | Wellman ................ B25J 9/1612 |

FOREIGN PATENT DOCUMENTS

| | | |
|---|---|---|
| DE | 20 2013 010419 U1 | 1/2014 |
| DE | 10 2013 106640 A1 | 1/2015 |
| EP | 0 302 205 A2 | 2/1989 |
| EP | 1 761 444 A1 | 3/2007 |
| JP | S62 83903 A | 4/1987 |
| JP | 2002 205803 A | 7/2002 |
| WO | 2005/118436 A1 | 12/2005 |
| WO | 2015/035300 A1 | 3/2015 |
| WO | 2015/097736 A1 | 7/2015 |

OTHER PUBLICATIONS

Gudehus T.: "Logistik 2", Jun. 30, 2012, Springer Vieweg, pp. 641-643.

Scaglia Indeva Spa: "INDEVA AGV Automatic Guided Vehicles", Jul. 31, 2015, http://www.indevagroup.com/wp-content/uploads/2015/10/agv-indeva-low_UK.pdf, pp. 1-12.

Abdel-Hamid et al., A.: "Simulation and Optimierung einer PC-Fertigung unter Echtzeitbedingungen"; Berlin, Spring, 1995, pp. 261-263.

* cited by examiner

STORAGE AND ORDER-PICKING SYSTEM

RELATED APPLICATIONS

This is a continuation application of the co-pending international patent application WO 2017/036780 A1 (PCT/EP2016/069382) filed on Aug. 16, 2016, which claims the priority of the German patent application DE 10 2015 114 393.3 filed on Aug. 28, 2015, both of which are incorporated herewith by reference.

BACKGROUND OF THE INVENTION

The present invention relates to a method for operating a storage and order-picking system as well as to a storage and order-picking system itself. In general, the invention operates in accordance with the man-to-goods principle.

RELATED PRIOR ART

The document WO 2015/035300 A1 discloses an order-picking method and an order-picking system in a distribution center. In order to collect piece goods and/or cases or packing units (PU, i.e. cases) in an article-orientated and/or order-orientated manner autonomously movable vehicles are used for transporting piece goods, cases, and/or load carriers (hereinafter designated as "goods") retrieved from a warehouse. Picking is conducted in accordance with the man-to-goods principle. The transport of the goods is performed substantially by means of the autonomously movable vehicles (cf. FIG. 8). Retrieval and delivery of the goods (at least in a first picking stage) is conducted preferably manually. This means that the goods are taken by a human and delivered to one or more of the autonomously movable vehicles. The delivery occurs in an article-orientated manner in the two-stage picking process, and in an order-orientated manner in the one-stage picking process. A grabbing robot, which is preferably installed on the base of an autonomously drivable vehicle, can be used as an alternative to humans. With the one-stage picking process the vehicles transport the collected goods into a packaging area, or directly into a shipping area. With the two-stage picking process the vehicles transport the collected goods to a sorting device where the collected goods are distributed to destination points in an order-orientated manner.

The document WO 2015/035300 discloses, as a sorting device, a combination of a "pick-and-place" robot and a consolidation rack including a plurality of rack compartments which are filled and emptied from opposite sides of the rack. A first side of the consolidation rack is filled by the robot in an order-orientated manner. This means that each rack compartment is assigned to one order. The opposite side of the rack is emptied manually as soon as each good of an order has been deposited in the corresponding rack compartment. The goods removed from the rack compartment are given manually into a destination container which can be already realized by a shipping container.

The autonomous drivable vehicles of the document WO 2015/035300 can navigate autonomously and thus can move through the system without forced guidance. With the one-stage picking process it might happen that the order, i.e. the vehicle and the picking person, needs to move through the entire system for collecting each of the goods of the order. This means that the vehicle needs to travel long paths and thus requires a lot of time for processing the order. With the two-stage picking process it is necessary to provide a separate sorting device which distributes the collected goods in an order-orientated manner. The sorting device is expensive. The sorting process requires time. The sorting process requires controlling and checking efforts.

Further, classic picking methods are known where the goods are provided statically, wherein it is also picked in accordance with the man-to-goods principle. Such picking methods are describes in the book "Logistik" by Timm Gudehus (ISBN 3-540-65206-X) and are shown in the FIGS. 9 to 12 originating from this book.

The FIGS. 9 to 11 respectively show an order-picking system including static provision of the goods in racks. The picking person removes the goods from the racks and delivers the same into a destination container (such as a pallet or collecting container) which is carried along, while the picking person moves in a meandering pattern through the entire warehouse. The picking person walks either through the rack aisles (FIG. 10) or travels on a storage and retrieval device through the aisles (FIG. 11) while he/she carries along the destination container(s). A drawback of this picking method is to be seen in that the picking person needs to cover long paths for collecting each of the goods of one order. With other words this means that a (transfer-) action density (removals and deliveries per walking meter of the picking person), as a rule, is extremely low. The picking performance (number of completed orders per unit of time) is low. Such picking methods are not suitable for e-commerce applications because e-commerce applications have a particular order structure. The order structure of e-commerce applications distinguishes in that the orders comprise typically some few order lines (type of goods) including small quantities (respective number of types).

Further, a picking method (zone picking) is known which operates in accordance with the man-to-goods principle, wherein the goods in turn are provided statically, however, the picking person moves within a limited zone as depicted in FIG. 12. FIG. 12 shows a system where a conveying system (i.e. a steady conveyer) is located preferably within a rack aisle between two racks arranged adjacent to each other. Laterally and in parallel to the central conveying system so-called "conveying-system loops" extend where destination containers (order containers) are discharged in order to be filled with goods by the picking person, which goods are retrieved from the racks by the picking person in accordance with the picking orders, wherein one picking order can be distributed to several zones and/or order containers. With this method a problem exists in that the picking persons are not always employed optimally within their fixedly assigned with regard to the work load. In peak times it is possible that the picking person is overloaded, i.e. the to-be-transferred goods within its zone cannot be given fast enough into the order containers because the picking person needs to transfer too many goods. This problem can be solved by increasing a number of the picking persons working within this zone. Thereby, however, manpower costs increase. Further, then the problem exists that during times of low system utilization too many picking persons are present. This in turn means that the respective picking persons do not work efficiently (in terms of economics) because they need to transfer too little goods per unit of time.

Another problem with the above-mentioned (multiple-stage and/or multiple-zone) "loop picking" is to be seen in that the destination containers can only be sorted and sequenced under difficulties or not at all. In this context sequencing is to be understood such that the order containers arrive in a preset order at the destination point. Here, sorting is to be understood such that the order containers arrive at the right destination point of a plurality of destination points possible. In order to perform the sorting successfully a sorting device (such as a circulating tilt-tray sorter or the like) in turn needs to be provided additionally. The sequencing possibilities are extremely limited, and, with this example, are only possible by feeding into and discharging from the conveying-system loops.

A further development of the classic multiple-zone picking process is disclosed in US 2002/008723 A1. Also, the document US 2002/008723 A1 discloses a conveying system, in terms of a belt conveyor, being arranged centrally between racks in a rack aisle. The goods are retrieved manually from the storage-rack compartments and are delivered manually into intermediate containers or collecting container being arranged stationary in a huge number above the conveying belt and along the conveying belt. Such an arrangement is shown in FIG. 13. The rack is divided into several zones (A, B, C, and D). Each of the zones is assigned to a certain number of collecting containers (A1-A4, . . . , D1-D4) and one picking person. In general, it is possible to distribute one of the picking orders to several ones of the zones A-D. In this case, in each of the zones a partial order is processed, wherein the partial orders need to be merged (in a sorted manner) at the end of the process. Thus the processing of one picking order can happen simultaneously in several zones, i.e. in parallel.

In the document US 2002/008723 A1, in order to be able to omit a sorting device, partial orders present in the collecting containers are discharged in a coordinated manner to the belt arranged centrally. Hence, the belt collects (sorts) partial orders which belong together by throwing the corresponding partial orders at the right time onto the belt, namely when an area of the belt assigned to the order passes the corresponding collecting container(s). Therefore, it might happen that each of the collecting containers of one zone are occupied although the picking person working in this zone could collect additional goods for other partial orders, but in this case cannot deliver the collected goods to a free collecting container. Hence, if the system is operated without a sorting device the performance (processed picking orders per unit of time) decreases. This problem does not exist if a sorting device is employed which distributes the partial orders to the correct destinations (order). The utilization of a corresponding sorting device, however, costs money. Corresponding space for the corresponding sorting device is required within the system. The corresponding sorting device is often implemented in terms of an endless circulating conveyor (e.g., tilt-tray sorter) to which a plurality of destinations are coupled. This endless circulating conveyor, however, in turn comprises a finite capacity so that at the end a decrease of the overall performance occurs again.

Further, again it is not possible to sequence the orders. Thus, for example, it is not possible that the orders overtake because the orders are selected in a serial manner on the central belt. Prioritization of an order is not possible either. Prioritization in the following is to be understood as favoring a younger order in comparison to orders which are already dispatched into the system.

SUMMARY OF THE INVENTION

Thus, it is an object of the present invention to provide a storage and order-picking system as well as a method for operating the same, which in general operate in accordance with the man-to-goods principle and which enhance the above-mentioned approaches. In particular, orders shall be processable in a multi-parallel manner. Preferably, the workload distribution is to be optimized.

According to an aspect of the invention it is disclosed a method for operating a storage and order-picking system in which a plurality of manipulators process a plurality of picking/storing orders in accordance with a manipulator-to-handling-unit principle, wherein the system comprises a provision zone, a picking zone, a plurality of provision units in the provision zone, a plurality of transfer locations, preferably arranged stationary, in the picking zone, a driverless transport system (DTS) including a plurality of driverless transport vehicles (DTVs), and a controlling device, and wherein the method comprises the steps of: analyzing the plurality of picking/storing orders by means of the controlling device for determining retrieval/delivery locations in the provision zone; setting transfer actions by selecting for each of the retrieval/delivery locations one or more of the transfer locations in the picking zone as delivery/retrieval location and by assigning the same thereto, wherein the delivery/retrieval location is located within an action zone extending around the respective retrieval/delivery location and moving dynamically with the respective manipulator; generating an action order for each of the manipulators by: selecting some of the transfer actions; and setting a, in particular unidirectional, moving path along which the respective manipulator moves between the selected retrieval/delivery locations through the, preferably entire, picking zone; and generating transport orders for the DTVs so that each of the manipulators can perform, during performance of its action orders, its transfer actions within its action zone, in particular without interruption.

In general a retrieval/delivery locations might be designated as removal/delivery locations as well, and delivery/retrieval locations might be designated as delivery/removal locations as well. The term "retrieval/delivery location" means that the corresponding location serves for retrieval upon picking, and serves for delivery upon storing, or replenishing. The term "delivery/retrieval location" means that the corresponding location serves for delivery upon picking, and serves for retrieval upon storing, or replenishing. This depends on whether an associated order is a picking order or storing order, i.e. a picking/storing order.

According to another aspect of the invention it is disclosed a method for operating a storage and order-picking system. This system comprises a plurality of manipulators which can be represented by humans and/or machines. The plurality of manipulators processes a plurality of picking orders and/or storing orders (picking/storing orders) in accordance with the manipulator-to-handling-unit principle (in general, man-to-goods principle). The system comprises: a provision zone, a picking zone, a plurality of provision units in the provision zone, a plurality of, preferably stationary arranged, transfer locations in the picking zone, a driverless transport system (DTS) including a plurality of driverless transport vehicles (DTV), as well as a controlling device. In general, the provision zone is a storage area which can be implemented, for example, by shelving racks or flow-channel racks, storage lifts, or pallet-provision locations. The provision units can be realized by piece goods and cases or packing units typically including a load carrier (such as a storage container, carton, tray, etc.). The handling units (piece goods and/or cases/packing units) represent the "goods" mentioned above, and are typically realized by the piece goods and/or cases/packing units (cases) without the load carriers. The transfer locations can be arranged in a (rack) aisle and/or in the rack. If they are arranged in the rack, which is typically arranged in the provision zone, the picking zone extends into the provision zone so that the provision zone and the picking zone overlap. The DTV and the transfer locations preferably interact meshingly, passively, and autonomously. The controlling device fulfills several tasks such as order processing, picking-guidance strategy, material-flow control, warehouse management, DTV navigation, DTV selection, and the like. Picking-guidance strategies can be realized by, for example, pick-by-voice, pick-by-vision, pick-by-light, put-to-light, and the like. In particular, the controlling device carries out the following steps: analyzing the plurality of picking/storing orders; setting transfer actions; generating manipulator-specific work-load optimized action orders; and generating transport orders for the DTV. A picking/storing order can have one or more order lines, as frequently occurring with piece-picking applications, case-picking applications, or the like. The analysis of the picking/storing orders is performed for the purpose of determining retrieval/delivery locations (sites, stations, compartments, channels, etc.) in the provision zone, wherein preferably an (existing) distribution of the handling units within the provision zone is considered. In this case a retrieval location (source) is determined for the picking orders. A delivery location (destination location) is determined for the storing orders. The setting of the transfer actions is performed by selecting for each of the retrieval/delivery locations one or more of the transfer locations in the picking zone as, preferably potential, i.e. selectable by the manipulator, delivery/retrieval location(s) (destination for picking/source for storing) and by assigning the same thereto, wherein the delivery/retrieval location is located within an action zone which extends around the respective retrieval/delivery location and moves dynamically with the respective manipulator while the manipulator walks along the selected retrieval/delivery locations. Delivery locations are selected for and assigned to the picking orders. Retrieval locations are selected for and assigned to the storing orders. The action orders are generated by: selecting some of the transfer actions, in particular so that a, preferably local, action density and a work load are adjusted to each other, wherein the work load represents a, preferably location-independent, desired (i.e. in particular preset, ergonomically allowable, or economically meaningful) number of transfer actions per standard length of a picking zone, and wherein the action density represents a location-dependent, preferably manipulator-specific, number of the selected transfer actions per standard length of a picking zone; and setting a, in particular unidirectional, moving path along which the respective manipulator moves between the selected retrieval/delivery locations (sources) throughout the, preferably entire, picking zone. The transport orders for the DTV are preferably generated only when the action orders are generated. The generation of the transport orders for the DTV can be performed such that each of the manipulators, during performance of its action order, can perform its transfer actions within its action zone, preferably without interruption. In particular, this happens by the DTV preparing the corresponding selected transfer locations within the action zone, and/or downstream thereto, in time. In particular, this means that the corresponding selected transfer locations are cleared, and/or destination containers and/or replenishment containers or storing containers are deposited there. Free of interruption means, in particular, that the manipulators do not need to wait until the corresponding selected transfer location is cleared or loaded correspondingly. Preferably, in time means that the manipulators never have to wait for the execution of a transport order by the DTV while the manipulators move along their moving paths throughout the picking zone.

According to further aspect of the invention it is disclosed, in a storage and order-picking system, a method for operating the system, in which system a plurality of manipulators process a plurality of picking/storing orders in accordance with a manipulator-to-handling-unit principle operating in accordance with the "man-to-goods" principle where at least one of humans and machines are employed, wherein the system comprises: a provision zone; a picking zone adjacent to the provision zone; a plurality of provision units in the provision zone; a plurality of transfer locations arranged stationary in the picking zone, a driverless transport system (DTS) including a plurality of driverless transport vehicles (DTVs); and a controlling device; wherein the transfer locations respectively comprise a frame on which handling units are deposited for retrieval or delivery by the DTVs, and wherein the method comprises the steps of: analyzing the plurality of picking/storing orders by means of the controlling device for determining retrieval/delivery locations in the provision zone; setting transfer actions by selecting, for each of the retrieval/delivery locations determined, at least one of the transfer locations in the picking zone as delivery/retrieval location in the picking zone and by assigning the same to the respective retrieval/delivery location in the provision zone, wherein the selected delivery/retrieval location is located within an action zone, which action zone extends around the respective retrieval/delivery location in the provision zone and moves dynamically with the respective manipulator, wherein each of the transfer actions further defines a number and type of the handling units which are to be transferred by the respective manipulator between the locations being assigned to each other; generating an action order for each of the manipulators by: selecting some of the transfer actions set; and setting a moving path along which the respective manipulator has to move between the selected retrieval/delivery locations in the provision zone throughout the picking zone; and generating transport orders for the DTVs so that each of the manipulators is enabled to perform, during performance of its action orders, its transfer actions within its action zone due to the DTVs preparing the corresponding selected transfer locations at least one of within the action zone and downstream thereto in time.

Hereinafter advantages of the invention and differences to the known systems and methods described at the outset will be described.

A basic perception of the present invention is to be seen in that reverse dynamics are applied. With the invention, during the picking process, the destination locations and, during the storing process, the sources are handled dynamically. The DTV ensure that the manipulators can perform their respective transactions without interruption at their respective locations. This means that the manipulators do not need to wait for their destination locations (e.g., order or shipping containers during picking) and sources (goods-receipt containers or goods during the replenishment process), respectively. The (moving) path and the current location of the manipulators trigger the transport orders of the DTV.

The transfer locations can be occupied dynamically. This means that the transfer locations can be used several times, in particular by several manipulators, for different orders or partial orders. With a particular embodiment the manipulator decides in real time, i.e. only briefly before the delivery, which of the transfer locations to select from the several possible transfer locations. If the manipulator, for example, starts a picking order it is within its discretion to select one of a plurality of empty order containers which have been provided at the transfer locations preferably in advance within its (current) action zone, i.e. in the immediate vicinity of the retrieval location. In spite of this uncertainty (which one of the possible destination locations/transfer locations is selected by the manipulator?) the controlling device is capable of navigating the "order" (destination container) safely and efficiently, until its complete handling, through the system by synchronizing this destination container with its further transfer actions being assigned thereto and its movements, and by bringing the same fast to its destination location, respectively. This in turn means that the destination container is always provided in time at the right location for further transfer actions (order lines) of the corresponding picking order.

The dynamic occupation of the transfer locations also allows simultaneous operation of the storage and order-picking system in a picking mode and in replenishment, or storing, mode. The DTV can transport at the same time both the destination locations (e.g., order containers) and replenishment goods (with or without load carriers such as storage containers being filled with piece goods of one type only) within the system. This means with other words that within the system picking and replenishing, or storing can happen at the same time. This in turn results in an increase of efficiency. The replenishment which happens temporarily in parallel, however, represents an aspect of the multiple parallelism only.

The multiple parallelism is also expressed in that orders can be divided generally into several partial orders (order splitting). Both the orders and the partial orders can be distributed onto several manipulators (staff splitting), who can process the orders and/or partial orders simultaneously, i.e. in parallel. Further, it is possible that several manipulators simultaneously process the same destination location (picking process) or source (replenishment) and access the same, respectively.

Another particular advantage is to be seen in that the manipulators can work in a work-load optimized manner. Transfer actions which are to be performed within the system and which are defined by the orders, in particular by the plurality of the order lines, are distributed to the manipulators in an optimized manner (e.g., batch orientated, path optimized, etc.). Each of the manipulators is assigned to a, preferably manipulator-specific, number of transactions which are to be performed. This number of transactions defines the specific work load of the manipulator (e.g., picks/walking meter, or actions per standard length of a picking zone, or the like). Preferably, the specific work load substantially is equal for each of the manipulators. This means that each of the manipulators needs to perform roughly the same number of transfer actions per unit of time or standard length (e.g. walking meter), wherein the number of the transfer actions may fluctuate slightly within small boundaries.

Further, the invention allows path-optimized picking or storing. Alternatively and/or additionally, the invention allows batch-orientated picking or storing. Both the path optimization and the batch optimization can be conducted under consideration of a preset picking rate, or hit rate. In particular, this is possible because the transfer actions (removal during picking/delivery during storing) are decoupled from the transport of the corresponding goods by the DTV. Further, the goods can be buffered for an arbitrary time at the transfer locations. In general, it is true that a parking or travelling DTV itself can represent a buffer location.

As another advantage it is to be mentioned that the invention gets along without an individualizing tracking of the goods within the system. In general, it is not necessary to mark the goods in an individually distinct manner (e.g., by barcode, RFID tag, etc.). The tracking of the flow of goods within the system can be conducted on the basis of transport information of the DTV and confirmation information of the manipulators alone. The controlling device always has knowledge of locations where the DTV are located, preferably at present. In particular, the start and destination locations of the DTV are known. The manipulators in turn can confirm to the control device the successful performance of a transfer action (delivery of a removed article to the destination location). This confirmation information in turn can be used by the controlling device as starting signals for further transport orders of the DTV, and in particular for the planning thereof.

Contrary to the classic steady-conveyor systems switches, crossings, or branches, which require the use of identifying devices (e.g., light sensors, light barriers, scanners, cameras, or the like), are not present due to the utilization of the DTV. The DTV, and therefore the goods, can move through the system along transport paths, which can be selected arbitrarily. Series errors and order errors are excluded. This means that the goods cannot change unexpectedly its (relative) order during transport through the system. A rigid layout of the transport paths, such as with steady conveyers, does not exist. The DTV can be navigated arbitrarily through the system. This in turn allows utilization of the DTV for sequencing and sorting.

Classic initialization points are not required in the present system. A classic initialization point is characterized in that each destination location (e.g., order container) needs to pass this initialization point in order to allow assignment of an order, in terms of data, to the destination location. With the present invention the order initialization (assignment of a destination location to an order) occurs at the latest in the moment when the manipulator selects, for example, during the delivery of to-be-picked good one of several possible destination locations by throwing in the good, for example, into a container on one of the transfer locations. The initialization happens in this case also by delivery of the good to the destination location itself.

As another advantage it is to be mentioned that the dispatch of a picking/storing order into the system is possible at any time. This means that a new order, which is then processed in parallel (i.e., in particular, at the same time) to the already dispatched orders, can be added to the system without disturbing a course of already dispatched orders.

The present invention is applicable in a plurality of different fields. The invention can be used in the field of e-commerce. Further, the invention allows piece-good picking as well as case picking, wherein case picking represents the preferred application.

The invention can be scaled at any time by using, for example, more or less DTV, or more or less manipulators. During peak times more manipulators and/or DTV than usual can work at the same time in the system for increasing the performance.

In comparison to WO 2015/035300 the present invention distinguishes that the manipulators and the DTV or destination locations/sources (picking/storing) can move independently and in a de-coupled manner to each other. The invention does not require a sorting device since the sorting functionality (and if necessary also a sequencing functionality) is conducted by the DTV itself. With the invention loading and unloading of the DTV preferably happens passively, i.e. without a particular controlling device and actuators. WO 2015/035300 does not disclose work-load optimization. WO 2015/035300 also does not disclose dynamization of the destination locations. Also, transfer locations within the picking zone, and the functionalities and advantages being associated therewith, are not disclosed.

The present invention differs from US 2002/008723 A1 in the utilization of the DTV. The invention allows prioritization of an order at any time due to the prioritized order overtaking the other orders. This means that the processing of the orders and the arrival at a destination point can be changed arbitrarily at any time because the DTV can overtake each other. This is not possible with a collecting belt. In addition, the invention does not require a subsequent sorting device. With the invention goods which are difficult to handle and/or fragile can also be picked and stored. US 2002/008723 A1 does not allow this because the goods are dropped from the collecting containers onto the collecting belt. In addition, the collecting arrangements and the collecting belt of US 2002/008723 A1 require (within one aisle) more space than the invention. With the invention space is saved in the transversal direction of a rack aisle, in particular if the transfer locations are integrated into the rack. The integration of the transfer locations preferably occurs in one of the lowermost rack planes such as at the bottom where the collecting containers and the collecting belt of US 2002/008723 A1 cannot be provided for technical reasons. Further, with the present invention it is possible to withdraw a buffered good from the transfer location at any time if a DTV receives a corresponding transport order. With the US 2002/008723 A1 the dropping of the selected goods in any case needs to occur into a default area of the collecting belts (window concept).

Contrary to the other classic picking methods in accordance with FIGS. 9-12, the present invention is particularly distinguished by the work-load optimized mode of operation. Each of the manipulators is subjected, in average, to a similar work load. Nevertheless the manipulators can move through the system in a path-optimized manner. Further, several manipulators can work simultaneously within close space. The present invention merely ensures that collisions between the manipulators and the DTV are avoided. The invention is characterized by the multiple parallelism. In particular, this means that many orders can be executed by many manipulators at the same time, in particular at an equal averaged work load. A rigid layout does not exist because the fixed course of the conventional conveying systems, or storage and retrieval devices, disappears.

The manipulators "pull" along the action zones. In this respect the action zones move dynamically through the picking zone. The movements of the manipulators trigger movements, or transport orders, of the DTV. The manipulators, or its action zones, move from one retrieval/delivery location (source upon picking/destination upon storing) to a next retrieval/delivery location preset by an order of the selected transfer actions, i.e. the moving path. In this sense the manipulators "trigger" the transport orders, or the movements, of the DTV.

With a particular embodiment of the invention each of the action zones comprises an adjustable, preferably fixed, geometric dimension.

The spatial size of the action zones influences a number of transfer locations reachable within the respective action zone, and thus the possible transfer actions. The bigger the action zone is the more transfer locations can be located in the action zone. The bigger the action zone is, the higher an action density might be. There can be situations where a high number of (possible/selectable) transfer locations is desirable so that the size of the action zone is selected relatively large. In this case, in order to avoid that the work load of the manipulator becomes too high in comparison to a preset value, an additional manipulator can be used simultaneously within the same action zone for decreasing the number of the transfer actions, and thus the individual work load. Hence, the size of the transaction zone represents a variable parameter which can influence the work-load optimization. Even if the spatial sizes of action zones of different manipulators could be different, it is recommended to assign or allocate each of the manipulators to an action zone of an equal size. However, it is clear that such assignments are preferably valid for predetermined periods of time, and might be changed subsequently.

With another embodiment of the invention each of the transfer action further defines a number and type of the handling units which are to be transferred by the respective manipulator between the locations assigned to each other.

This information indicates to the manipulator a number of handling units which is to be transferred between the locations assigned to each other. This information can be indicated to the manipulator via a, preferably carried along, picking-guidance system (pick-by-vision, pick-by-voice, pick-by-light, put-to-light, or the like). The indication of the type of the handling unit additionally assists the correct performance of the transfer action. It is clear that also at least the retrieval/delivery location (source/destination location) can be displayed. Preferably, of course, the retrieval location (destination location/source) is displayed as well.

With still another embodiment of the invention an entirety of all transfer actions corresponds to the plurality of picking/storing orders.

For allowing conducting the optimization steps in a satisfying manner it is recommendable to consider a number of to-be-performed transfer actions which is sufficiently high. The sum of all transfer actions should cover the entirety of the orders. Of course, it is clear that less transfer actions can be considered as well. However, in this case the optimization becomes more difficult because it can be selected from less transfer actions per standard length of a picking zone in order to reach the desired work-load adjustment.

With another embodiment of the invention the average work load is substantially equal for each of the manipulators.

In this manner it can be prevented that the manipulators are stressed to different extents. This is of particular relevance with human manipulators for ensuring the general satisfaction. With machine manipulators it is ensured that each of the manipulators comprises a similar service life. The wear is reduced.

With another particular embodiment of the invention the step of analyzing is conducted under consideration of a distribution of the handling units in the provision zone, and/or under consideration of a structure, i.e. in particular a number of the lines, or the quantity per line, of the picking/storing orders for the purpose of the work-load optimized generation of the action orders.

Preferably, the distribution of the handling units across the provision zone is static. This means that the distribution is not changing for at least a certain period of time (e.g., a day or week). The distribution of the handling units in this sense is not chaotic or dynamic since the dynamics are mapped by the movements of the DTV.

Further, it is advantageous that the generation of the transport orders can occur dependent on a momentary location of the respective manipulator in the system, preferably in real time.

This expresses that a momentary location of the respective manipulator triggers the transport orders of the DTV. The controlling device is configured to recognize, or to determine, a current location of the respective manipulator, at least roughly. For this purpose, for example, the above-mentioned confirmation information can be used. Further, the moving path can be analyzed since the moving path preferably presets the order of the retrieval/delivery locations. If the controlling device has sufficient calculation capacity and a fleet of DTV being sufficiently huge it is possible to calculate the transport orders in real time. This means that the transport orders are not calculated in advance for a long period of time in the past but dependent on a current working speed of the respective manipulator. Thus, for example, it might happen that one of the manipulators works faster than usual, whereas another one of the manipulators works slower as usual. In this case the controlling device can utilize the DTV differently than normal. The manipulator working faster can be supplied with more DTV than the manipulator working slower. The controlling device is also capable of responding to work-load fluctuations in short time by adjusting the transport orders correspondingly. However, it is recommended to not plan to the point but to consider at least a certain predicting temporal buffer. This means with other words that the controlling device can determine predictively the transport orders already for a short period of time (e.g. one to two minutes) in advance.

With another embodiment of the invention each of the transfer locations can be selected several times but in a temporally shifted manner.

This means with other words that different manipulators can use the same transfer location for processing different orders in a temporally shifted manner. Even in this case the dynamics of the invention are expressed again.

Further, the invention is distinguished in that the handling units arrive in a sequenced, and/or sorted, manner at a respective destination location.

The destination location can be realized by a goods issue, a shipping area, a packaging station, a transfer location, or the like. Thus, the picking/storing orders can be sequenced and sorted without a separate sorting device.

In particular, an unambiguous identification is assigned (in terms of data) to each of the DTV and to each of the transfer locations, wherein the controlling device is configured to track a path (in terms of material flow) of each of the handling units through the system exclusively based on the transport orders and based on confirmation information which use the identifications of the transfer locations and the DTV.

According to still another aspect of the invention a storage and order-picking system in which a plurality of manipulators processes a plurality of picking/storing orders with a manipulator-to-goods-principle, wherein the system comprises: a provision zone; a picking zone adjacent to the provision zone and extending along the provision zone; a plurality of provision units arranged in the provision zone next to each other and/or on top of each other, wherein each of the provision units comprises at least one handling unit; a plurality of, preferably stationary arranged, transfer locations being arranged in the picking zone, preferably continuously, along the provision zone, and wherein each of the transfer locations is configured to receive and buffer one of the handling units; a driverless transport system (DTS) comprising a plurality of driverless transport vehicles (DTVs), wherein the DTVs and the transfer locations are configured to exchange the handling units, preferably passive and in a bidirectionally meshing manner, with each other, wherein the DTVs are movable autonomously; and a controlling device being configured to: analyze the plurality of picking/storing orders for determining retrieval/delivery locations; set transfer actions by selecting for each of the retrieval/delivery locations one or more of the transfer locations in the picking zone as delivery/retrieval location and by assigning the same thereto, wherein the delivery/retrieval location is located within an action zoneextending around the respective retrieval/delivery location and moving dynamically with the respective manipulator; generate, preferably in a work-load optimized manner, action orders for each of the manipulators by: selecting some of the transfer actions, preferably such that an action density and a work load are adjusted to each other, wherein the work load represent a desired number of transfer actions per standard length of a picking zone, and wherein the action density represents a location-dependent number of the selected transfer actions per standard length of a picking zone; and set, in particular a unidirectional, moving path along which the respective manipulator moves between the selected retrieval/delivery location through the, preferably entire, picking zone; and generate transport orders for the DTVs so that each of the manipulators, during performance of its action order, can perform its transfer actions within its action zone, preferably without interruption, due to the DTVs preparing the corresponding selected transfer locations within the action zone and/or downstream thereto in time.

Still another aspect of the invention is to be seen in a storage and order-picking system in which a plurality of manipulators process a plurality of picking/sorting orders in accordance with the manipulator-to-goods principle, wherein the system comprises: a provision zone; a picking zone adjacent to the provision zone, which extends along the provision zone; a plurality of provision units arranged in the provision zone next to each other and/or on top of each other, wherein each of the provision units comprises at least one handling unit; a plurality of, preferably stationary arranged, transfer locations arranged in the picking zone, preferably continuously, along the provision zone, and wherein each of the transfer locations is configured to receive and buffer one of the handling units; a driverless transport system comprising a plurality of driverless transport vehicles, wherein the DTV and the transfer locations are configured to exchange the handling units, preferably by meshing passively in a bidirectionally manner, with each other, wherein the DTV are autonomously movable; and a controlling device configured for executing the method of the invention.

According to a still further aspect it is disclosed a storage and order-picking system in which a plurality of manipulators processes a plurality of picking/storing orders with a manipulator-to-goods-principle, wherein the system comprises: a provision zone; a picking zone adjacent to the provision zone and extending along the provision zone; a plurality of provision units arranged in the provision zone at least one of next to each other and on top of each other, wherein each of the provision units comprises at least one handling unit; a plurality of stationary arranged transfer locations being arranged in the picking zone along the provision zone, and wherein each of the transfer locations is configured to receive and buffer one of the handling units, wherein the transfer locations respectively comprise a frame on which the handling units are deposited for retrieval or delivery by driverless transport vehicles (DTVs); a driverless transport system (DTS) comprising a plurality of the driverless transport vehicles (DTVs), wherein the DTVs and the transfer locations are configured to exchange the handling units with each other, wherein the DTVs are movable autonomously; and a controlling device being configured to: analyze the plurality of picking/storing orders for determining retrieval/delivery locations in the provision zone; set transfer actions by selecting, for each of the determined retrieval/delivery locations in the provision zone, at least one of the transfer locations in the picking zone as delivery/retrieval location in the picking zone and by assigning the same to the respective retrieval/delivery location in the provision zone, wherein the delivery/retrieval location is located within an action zone; which action zone extends around the respective retrieval/delivery location and moves dynamically with the respective manipulator, and wherein each of the transfer actions further defines number and type of the handling units which are to be transferred by the respective manipulator between the locations being assigned to each other; generate action orders for each of the manipulators by: selecting some of the transfer actions; and setting a moving path along which the respective manipulator has to move between the selected retrieval/delivery locations in the provision zone through the picking zone; and generate transport orders for the DTVs so that each of the manipulators, during performance of its action order, is enabled to perform its transfer actions within its action zone due to the DTVs preparing the corresponding selected transfer locations at least one of within the action zone and downstream thereto in time for the transfer of the handling units.

In accordance with a particular embodiment of the invention the handling units arrive without tracking at a respective destination location by means of the DTV.

In accordance with still another embodiment of the invention one to two, in particular three to four, transfer locations are provided along the provision zone per standard length of a picking zone.

Preferably, at least 50%, in particular 60% to 70%, of an overall length of the provision zone are provided with the transfer locations.

The high number of transfer locations, or the high density of transfer locations, ensures that the manipulators can either remove (picking) or deliver (replenishment) the desired handling unit, in particular without the need to wait. This action also happens in particular without interruption. Each individual one of the transfer locations can be served, preferably simultaneously, by one DTV.

In addition, it is advantageous if the transport of the handling units from and to the transfer locations is conducted exclusively by the DTV.

In particular, the DTV are responsible for the sorting, sequencing, free layout of courses, and the like.

BRIEF DESCRIPTION OF THE DRAWINGS

It is clear that the above-mentioned and hereinafter still to be explained features cannot only be used in the respectively given combination but also in other combinations or alone without departing from the scope of the present invention.

Embodiments of the invention are illustrated in the drawings and will be explained in more detail in the description below.

PREFERRED EMBODIMENTS OF THE INVENTION

Figure 1:
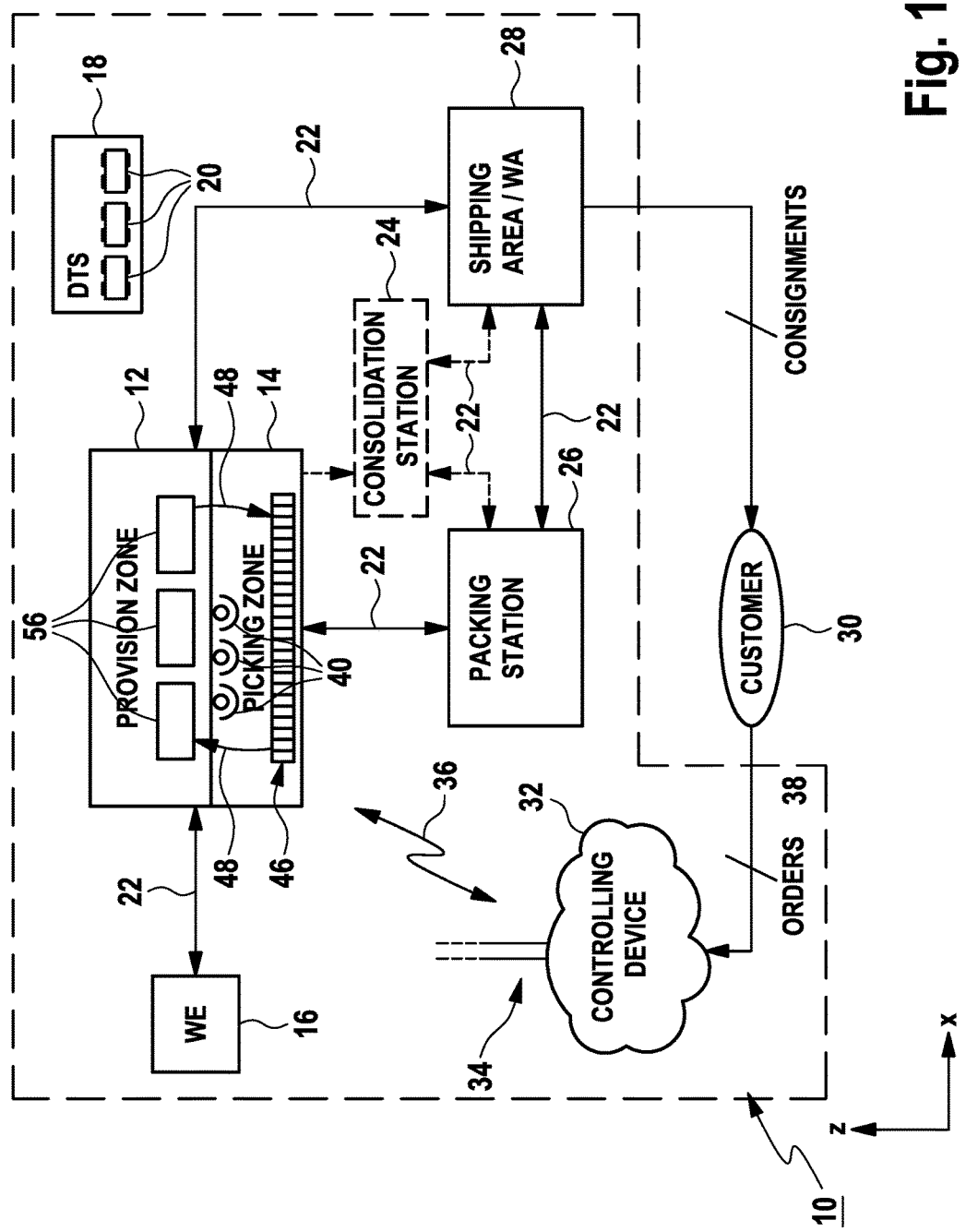
FIG. 1 shows a block diagram of a storage and order-picking system of the invention.

If vertical and horizontal orientations are mentioned in the following, it is clear that the orientations can be exchanged with each other due to a rotation, and therefore are not to be interpreted in a limiting manner. As usual in the field of (intra) logistics, in storage and order-picking systems (distribution centers, material-handling systems, etc.) a longitudinal direction is designated by "X", a transversal direction is designated by "Z", and a height direction is designated by "Y". The directions X, Y, and Z preferably define a Cartesian coordinate system.

In the following a provision unit is to be understood as a unit which is used in particular in the goods-receipt area and in the storage area (rack warehouse, ground warehouse, channel warehouse, etc.). A provision unit typically includes only one type but can also be provided in a mixed manner. The provision unit can comprise a load support and one or more handling units. Typically load supports such as pallets, grid boxes, containers, buckets, cartons, trays, (overhead) bags, and the like are used as load supports. However, the handling units can also be provided without storage-load supports, or load supports. In the following a handling unit is to be understood as one "article" or one "good". One good can be one piece good. One good can be a case. A handling unit is a (smallest) unit of an (article) assortment, which can be distinguished by the handling type. Piece goods are individualized distinguishable goods which can be handled individually and stock thereof is listed by pieces or as cases. The case is a general term for a handable unit which can be moved manually or by means of technical devices (load-handling device, grippers, etc.). The terms "article", "case", "good", and "piece good" will be used equivalently here.

A "picking order" is typically represented by a set of data which can be processed. The picking order can comprise a header field, a priority field, and/or an article field. The header field can comprise, amongst other things, information related to the customer who has deposited an order, (customer) address, or customer identification number as well as an order number. The priority field includes information on whether it is a normal order or an urgent order. An urgent order is an order having high (processing) priority, which is handled typically before normal orders.

A "rack arrangement" (e.g., a rack warehouse) typically includes a plurality of racks provided in terms of individual racks or double racks. Double racks are individual racks erected back-to-back. Between the racks rack aisles are defined which typically extend in a longitudinal direction of the racks and serve as an action space for manipulators, driverless transport vehicles (DTV, AGV, etc.), and/or storage and retrieval devices. The racks end at its opposing (shorter) front faces which in turn are orientated in a plane perpendicular to the longitudinal direction of the aisle. The racks comprise a plurality of (rack) storage locations, or deposition locations (e.g., rack compartments, end of a flow channel, etc.) which can be used with the present invention.

The terms "rack location", "storage location", "deposition location", "pallet location" are used equivalently. These "locations" mean locations within the system where the goods are stored. A "rack location", or a "rack compartment", is a location where the goods are provided within a rack for the purpose of picking.

A "transfer location" is a location where one or more goods can be buffered for the purpose of exchange with a driverless transport vehicle (DTV). The transfer locations serve for temporarily buffering one or more goods and can be connected to the DTV in terms of material flow. A transfer location can comprise a frame on which the goods can be deposited for retrieval or provision by the DTV. A transfer location can be realized by a "parking spot" for one of the DTVs. The transfer locations comprise fixedly defined coordinates within the system, and are preferably stationary, i.e. spatially fixed.

Further, the present invention is operated substantially in accordance with the principle "man-to-goods". If also machines are used apart from humans, this principle is also called "manipulator-to-goods-principle" in the present case. With these principles a human, who is also called a "picking person" in the following, and/or a machine can move to the good which is to be picked.

In general, different strategies are distinguished upon picking. The order-related picking and the article-related picking exist, wherein the collecting of the goods can either occur serially, i.e. one after the other, or in parallel, hence at the same time. With the order-related picking an order is processed in its entirety, i.e. each good of the order is collected serially and/or in parallel (order splitting). The way in which it is picked can depend on many factors. One factor, which definitely plays a role, is an average order structure. It makes a difference whether different goods are to be picked by little number of pieces or whether the same (type of) goods are to be picked again and again by high number of pieces. It makes a difference whether one order comprises many or few lines.

A "batch" is a synthesis of several orders to one processing lot. A "batch" also is a synthesis of several (picking) orders to one ordered quantity, or list of orders. In batch operation, orders are first collected and sorted, for being processed sequentially in one step, i.e. in a "batch".

Coordination of the processing of orders is handled by an order-handling system, which is most times integrated into a picking control which can comprise an enterprise resource planning system as well. The picking control can further have integrated a (storage) location administration as well as an information display. The picking control is typically realized by a data-processing system, which preferably operates in the online mode for data transmission and data processing free of delay. The picking control can be implemented by one or more controlling units which will be described in more detail below. The controlling device of the invention can include such a picking control.

With both the "case picking" and the "piece picking" the manipulators are directed to retrieval locations (destination locations) upon picking, or to delivery-locations (destination locations) upon replenishment or storing. In the following picking processes will be exemplarily considered exclusively. It is clear that the following explanations are also valid for replenishing or storing processes (replenishment), which only distinguish from picking processes in a transfer-action direction.

FIG. 1 shows a block diagram of a storage and order-picking system (hereinafter also briefly designated as "system") 10 in top view. The system comprises a provision zone 12 and, adjacent hereto, a picking zone 14. The provision zone 12 can be supplied with goods via a goods receipt (WE) 16. The goods, which are to be stored in the provision zone 12, originate from the goods receipt 16 and are picked (removed and delivered) subsequently in the picking zone 14 in accordance with picking orders. The picking can be performed in one stage or in several or multiple stages, as mentioned above.

Further, the system 10 comprises a driverless transport system (DTS) 18. The DTS 18 comprises a plurality of driverless transport vehicles (DTVs) 20. The DTS 18 with its DTVs 20 serves a material flow, or flow of goods, within the system 10, and in particular within the zones 12 and 14. The material flow within the system 10 is indicated by means of arrows 22. It is clear that each connection possible between the blocks of FIG. 1 is not depicted by an arrow 22. Further, it is clear that the material flow 22 in the entire system 10 does not need to be conducted by the DTS 18 only. Classic conveying systems such as steady conveyers, vertical conveyers, storage and retrieval devices, and the like can be used additionally between different blocks.

Optionally, the system 10 comprises a consolidation station 24 which is used in particular with multi-stage picking of cases (e.g., full-case picking). It is the purpose of the consolidation station 24 to sort goods in an order-orientated manner.

The system 10 can further comprise one or more packing stations 26 as well as a shipping area, or a goods issue (WA), 28. In the packing stations 26 (picking) orders, which have been collected completely, can be packed and/or moved from collecting containers into shipping containers. In the shipping area, or goods issue, 28 an order-orientated sorting process (e.g., for destination subsidiaries of a retail company) can occur again. The consolidation station 24 can be integrated into the picking zone 14, into the packing station 26, and/or into the shipping area 28. Orders, which are completely picked and packed, are shipped from the shipping area 28 in terms of consignments to the customers 30. The customers 30, which are not part of the system 10, place their customer orders, or orders, exemplarily over the Internet or over a different transmission path in the system 10. For the analysis and processing of the customer orders the system 10 comprises a controlling device 32, in particular a picking-control device. The controlling device 32 is in communication with the different components of the system 10 via fixed lines 34 and/or wireless (cf. arrow 36). In this case, in particular data connections are used.

The controlling device 32 can have several tasks. The controlling device 32 can be structured decentralized. The controlling device 32 can be structured in modules. In particular, the controlling device 32 implements one or more of the following functions: order administration, picking-guidance strategies, enterprise resource planning system, warehouse management, material-flow control, location management, DTV navigation, and DTV-route selection. These functions are typically implemented in terms of software and/or hardware. In addition, communication can occur via one (or more) communication bus(es). The controlling device 32 can be part of a central processor (not shown).

The order administration ensures that (picking) orders 38, which are coming in from the customers 30, are distributed for completion (processing) to several manipulators (humans and/or machines) 40. In this context, in particular the factor work load plays a role. Further factors such as goods-assortment distribution, path optimizations, and the like can also play a role. The manipulators substantially have the task to transfer the goods, i.e. to grab and deliver the goods. The picking orders 38 can be divided for processing, e.g., into partial orders. The picking orders 38 can further be processed for "batch picking". The controlling device 32 is adapted to analyze picking orders 38, which are coming in and which came in, with respect to, and in particular such that, a plurality of batches is formed, wherein one batch is characterized by the sum of each of the goods of a respective type of goods over each order 38, which came in and is to be analyzed.

The manipulators 40 substantially move between the provision zone 12 and the picking zone 14, as it will be explained in more detail below.

Figure 2:
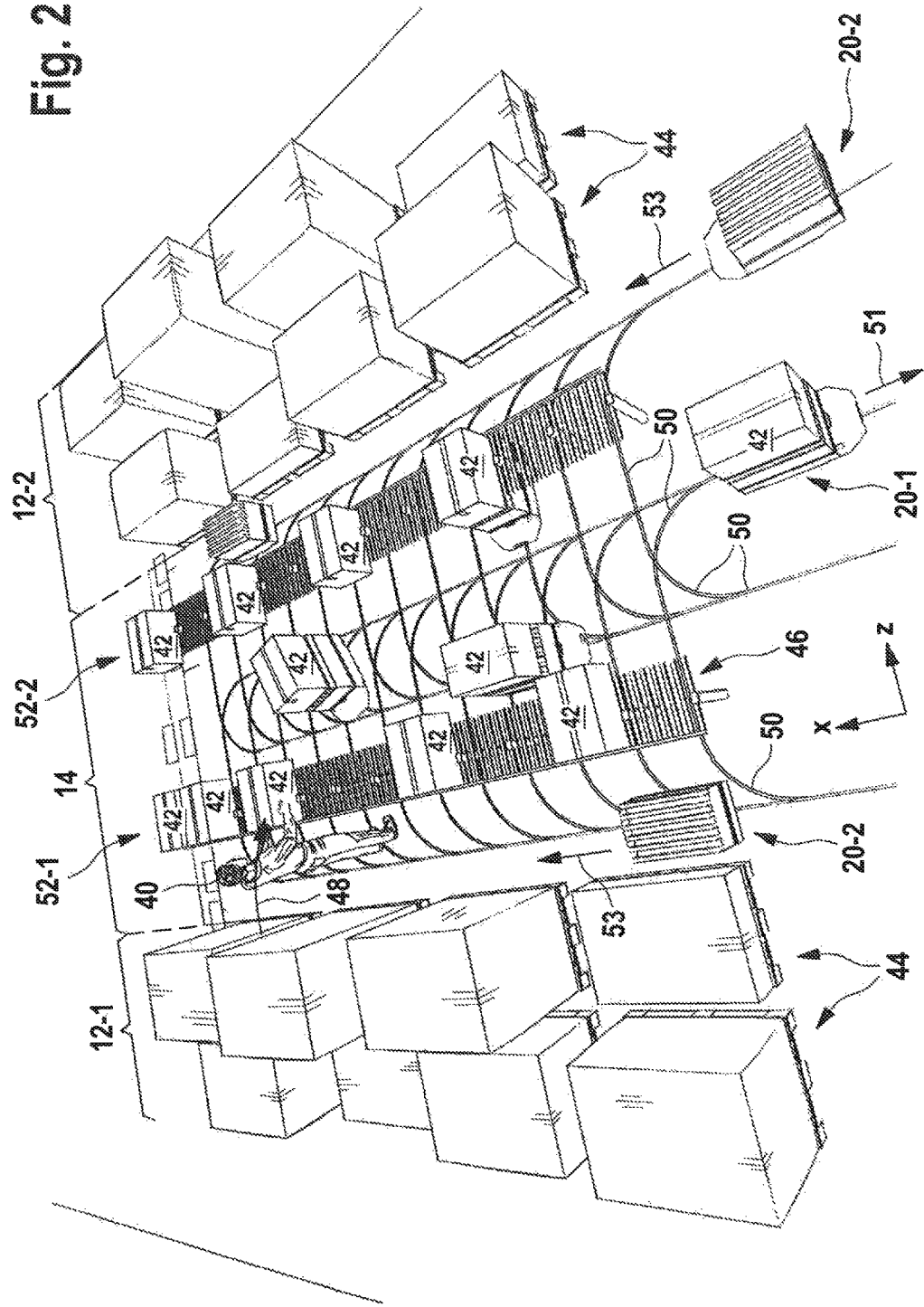
FIG. 2 shows a perspective view of an embodiment of the system during a case-picking application.
Figure 3:
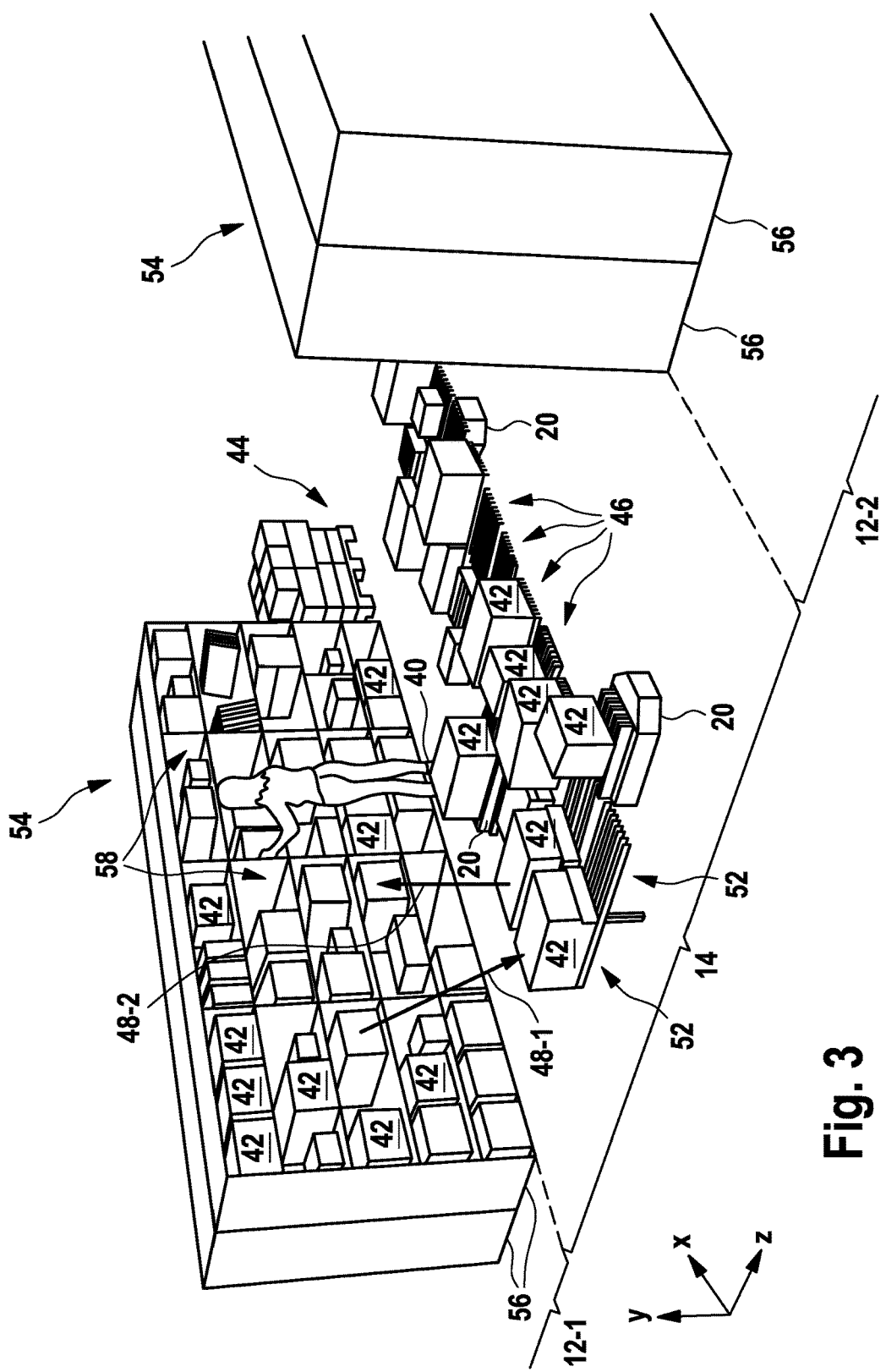
FIG. 3 shows a perspective view of another embodiment during a case-picking application.
Figure 4:
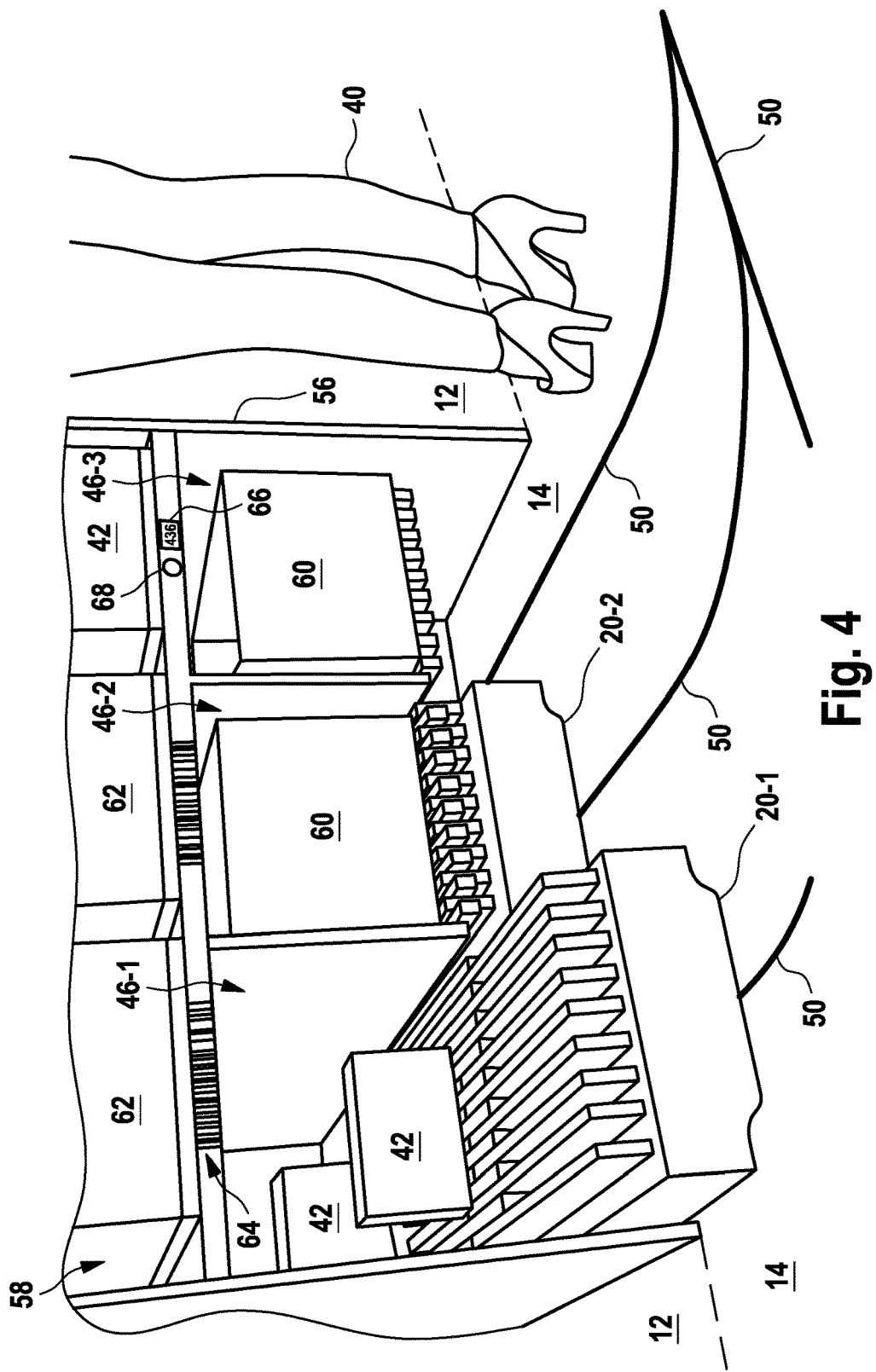
FIG. 4 shows an enlarged perspective view of a mixed application of case picking and piece picking.

FIGS. 2 to 4 show different applications of the present invention.

FIG. 2 shows a perspective view of a multi-stage case-picking application, wherein the first picking stage is shown in particular. A human manipulator 40 removes cases 42 from pallets 44, which are preferably holding only one type, wherein the pallets are provided, for example, in two provision zones 12-1 and 12-2. The removal of one or more cases 42 from one of the pallets 44 and the delivery to one of the transfer locations 46 represents a transfer action being illustrated by an arrow 48. The DTV 20 and the transfer locations 46 are formed as described, for example, in the patent application "Fahrerloses Transportsystem in einer Lager- and Kommissionieranlage" (DE 10 2015 114 370.4) filed by the applicant of the present application at the same day as the present application. In this case the DTVs 20 move along traveling paths 50 which can map arbitrary (fixed) courses. For example, the traveling paths 50 can be taped like strips, for example, onto a hall floor. The DTVs 20 move along the traveling paths 50 as exemplarily indicated by an arrow 52 for the DTV 20-1. The DTV 20-1 is loaded with one (or more) cases 42 and transports the removed cases 42 to the consolidation station 24, to the packing station 26, and/or to the shipping area 28 (respectively not shown).

The transfer locations 46 are arranged in the picking zone 14. In FIG. 2 the transfer locations 46 are arranged exemplarily in two, preferably continuously formed, rows 52-1 and 52-2. It is clear that the transfer locations 46 can also be arranged in a discontinuous manner. The rows 52-1 and 52-2 are arranged, for example, distanced to each other in a transversal direction Z of the system 10, and define an aisle therebetween which can be used by the DTVs 20 for transporting the retrieved cases 42. The DTVs move within this aisle preferably unidirectionally. In the example of FIG. 2 the DTVs 20 move from top to bottom, as indicated by the arrow 52 (one-way rule). Unladen DTVs 20, such as the DTV 20-2, can move in an area being used in common with the manipulators 40, preferably also according to a one-way rule, towards the transfer locations 46, as exemplarily indicated by an arrow 53.

FIG. 3 also shows a case-picking application. In FIG. 3 the transfer locations 46 are arranged centrally in the picking zone 14 between two provision zones 12-1 and 12-2. In the provision zones 12-1 and 12-2 rack arrangements 54 are provided. The rack arrangements 54 can be formed by one or more racks 56. The (human) manipulator 40 removes cases 42 from rack compartments 58 (sources) upon picking, and deposits them onto a free, or assigned, transfer location 46, which is either transmitted in advance to the manipulator 40 or selected by the manipulator 46 and subsequently transmitted to the controlling device 32. The picking is exemplarily indicated in FIG. 3 by one transfer action 48-1. A storing process is exemplarily illustrated by another transfer action 48-2. Upon storing, a case 42 which, for example, originates from the goods receipt 16 and which has been deposited on one of the transfer locations 46, is delivered to a preset (empty) rack compartment 58 (destination location) by the manipulator 40. The transport of the case 42 from and to the transfer locations 46 in turn is performed by the DTVs 20 which are formed in a self-navigating manner in the example of FIG. 3, so that the force-guided traveling paths 50 (cf. FIG. 2) can be omitted. The transfer locations 46 in turn are arranged in rows 52 extending continuously along the racks 56 in order to provide many transfer locations 46, if possible. However, the rows 52 can be arranged in the transversal direction Z without distance. If the transfer locations 46 and the DTVs 20 are formed in accordance with the above-mentioned parallel application (DE 10 2015 114 370.4) the travelling direction of the DTVs 20 through the transfer locations 46 decides whether a case 42 is delivered or received. Preferably, the DTVs 20 can travel in both directions along Z through the transfer locations 46. In this sense, FIG. 3 shows "double-transfer locations". While one of the transfer locations 46 of the double-transfer location is loaded, the other transfer location 46 of this double-transfer location is unloaded by the same DTV 20 when the travel is continued.

Further, it is clear that a type of the provision of the case 42 in the provision zones 12 is arbitrary. Therefore, one additional pallet 44 is exemplarily shown in FIG. 3, which pallet serves either as a source or as a destination location.

FIG. 4 shows a further (enlarged) perspective illustration of an application with which both piece picking and case picking can be operated simultaneously. It is clear that piece picking might also be operated alone. Upon piece picking the piece goods (not illustrated in more detail here) are delivered to order containers 60 (destination locations) which have been removed previously from storage containers 62 (sources). In the present case, the transfer locations 46 are exemplarily integrated into, for example, the lowermost plane of a rack 56. The picking zone 14 extends in this sense in an overlapping manner into the provision zone 12 where the rack 56 is arranged. In general, the transfer locations 46 and/or the rack compartments 58 can be provided with identifications (such as barcodes 64, numbers 66, or the like) for unambiguously identifying the transfer locations 46 and/or the rack compartments 58, which represent the sources and destination locations, respectively. Further, picking-guidance elements such as lamps 68 or the like can be provided exemplarily.

The transfer locations 46-1 to 46-3 of FIG. 4 are exemplarily formed single-deep. The DTVs 20 travel forward into the transfer locations 46 and rearward from the transfer locations 46. Therefore, it is necessary to provide an active lifting device for each of the transfer locations 46 in order to allow the elements of the DTVs 20 and the transfer locations 46, which are meshing with each other, to deliver and receive the goods which are to be transferred. In this case, for example, the DTV 20 is provided with a lift. The load-handling device of the DTV 20-2 is shown in an elevated state in the transfer location 46-2, whereas the load-handling device of the DTV 20-1 in the transfer location 46-1 is shown in a lowered state.

With simultaneous reference to the FIGS. 5 to 7 a method 70 for operating the system 10 will be described in the following, wherein the controlling device 32 is used.

Figure 5:
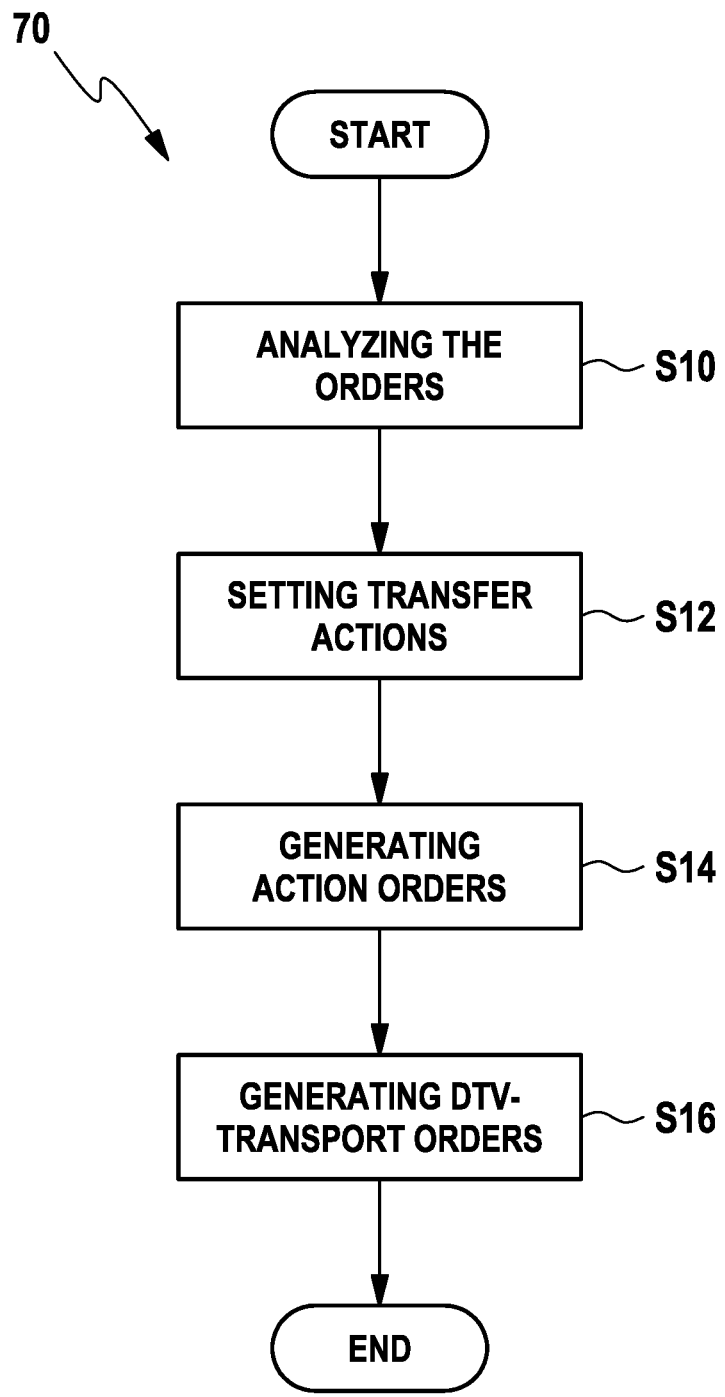
FIG. 5 shows a flow chart of a method for operating a storage and order-picking system in accordance with the invention.

FIG. 5 shows a flow chart of the method 70. The method 70 substantially comprises the steps S10 to S16. In the step S10 the picking orders 38 and/or storing orders are analyzed. Based on this analysis the transfer actions 48 are determined, or evaluated, and distributed in step S12. As soon as transfer actions 48 are set, action orders are generated for each of the manipulators 40. An action order is distinguished by a selection of transfer actions 48 and a moving path of the respective manipulator 40 through the picking zone 14. In step S16 transport orders for the DTVs 20 are generated so that each of the manipulators 40, during performance of its action order, can perform its transfer actions within an action zone 72 (cf. FIG. 7), preferably without interruption. The action zone 72 represents a space in which the manipulator 40 moves during wandering from one retrieval/delivery location (source) to the next retrieval/delivery-location (next source). The moving path 74 of the manipulator 40 of FIG. 7 starts in starting point 76 and ends, for example, at the second retrieval/delivery location in the picking zone 14. Subsequently the manipulator 40 can take a new action order by returning either to the starting point 76 or by starting a new action order from its current location. It is also possible that the manipulator 40 moves back a little for beginning or performing the new action order. Preferably, however, the manipulator 40 moves in one direction only, i.e. unidirectionally, through the picking zone 14. In this context it can be advantageous if the manipulator 40 moves recurrently through the entire picking zone 14. It is clear that the manipulator 40, as soon as it has arrived at an end of the picking zone 14, can revert its (unidirectional) movement for getting to the opposite end of the picking zone 14. Of course, it is also possible that the manipulator 40 returns to the starting point 76, and thus traverses the picking zone 14 always in one single direction only.

Figure 6:
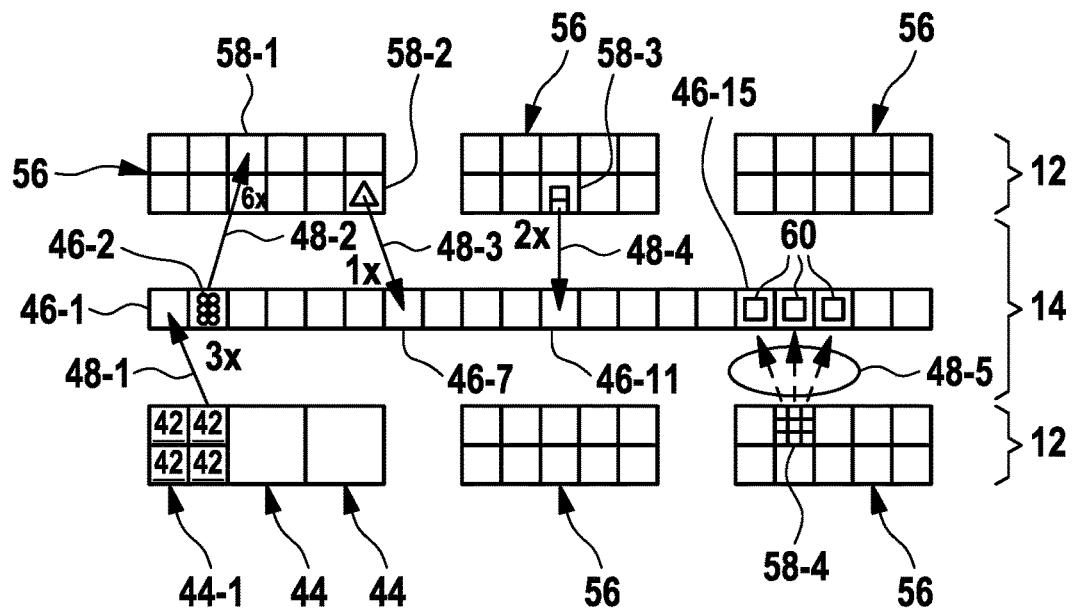
FIG. 6 shows a block diagram of a system for illustrating an action order as well as a moving path.

FIG. 6 shows top view of a schematically illustrated system 10 and serves for illustrating an exemplary action order for a (single) manipulator 40. Each of the action orders is formed by a plurality of transfer actions 48. With a first transfer action 48-1 the manipulator 40 (not shown) is required to remove three cases 42, for example, from a pallet 44-1, and to deliver the same to a first transfer location 46-1. A second transfer action 48-2 represents a storing order, according to which six piece goods being provided on a transfer location 46-2 are to be stored into a rack compartment 58-1. With a third transfer action 48-3 one piece good is to be removed from the rack compartment 58-2 and is to be delivered to the transfer location 46-7. In accordance with a fourth transfer action 48-4 two piece goods from a rack compartment 58-3 are to be delivered to a transfer location 46-11. A fifth transfer action 48-5 is intended for illustrating that the manipulator 40, upon picking, might possibly select from several transfer locations 46 for setting a destination location itself. The transfer action 48-5 merely defines the retrieval location, namely the rack compartment 58-4 as well as a quantity which is to be removed, for example, one piece. As the picking order 38, on which the transfer action 48-5 is based, consists, for example, of this one piece only and since three empty order containers 60 (destination locations) on the transfer locations 46-15 to 46-17 in the direct vicinity of the rack compartment 58-4 are present, wherein the transfer locations 46-15 to 46-17 are within the corresponding action zone 72, the manipulator 40 can select one of these order containers 60 which is subsequently brought to an associated destination location (consolidation station, packing station, or shipping area) by the DTVs 20. The DTV 20 which are not shown in FIG. 6 can respond, dependent on the situation, to actions of the manipulator 40 in that the controlling device 32 generates corresponding transport orders. This means that it is not necessarily required that the controlling device 32 determines each of the transport orders for the DTVs 20 in advance, i.e. before the manipulator 40 begins its path through the picking zone 14. Also, it is not required that each of the transfer locations 46 is already prepared for the respective transfer action 48 at the beginning of the performance of an action order. The controlling device 32 merely needs to ensure that the transfer locations 46 within the action zone 72 and, if necessary, some of the transfer locations 46 located downstream are prepared correspondingly. The transfer locations 46 are prepared if, for example, having been emptied, loaded with empty order containers 60, loaded with a pre-picked order container 60, or loaded with a storage container 62 or a good for the storing process. It is clear that the picking process and the storing process can occur simultaneously, i.e. within one action order. Alternatively, picking processes and storing processes can be assigned to different manipulators 40 so that each of the manipulators 40 either picks (only) or stores (only). This can depend on an action density 78 (number of transfer actions per standard length) as will be explained with reference to FIG. 7.

Figure 7:
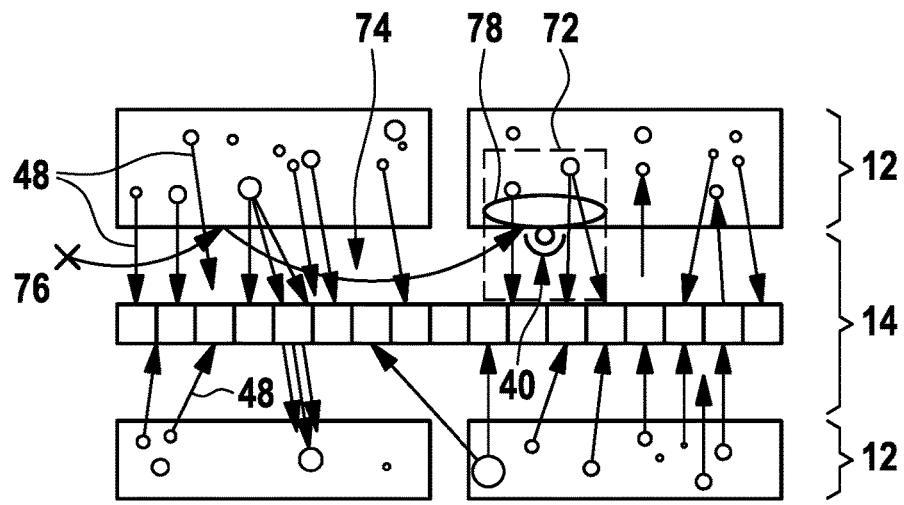
FIG. 7 shows a schematic block diagram of an action density as well as an action zone.
Figure 8:
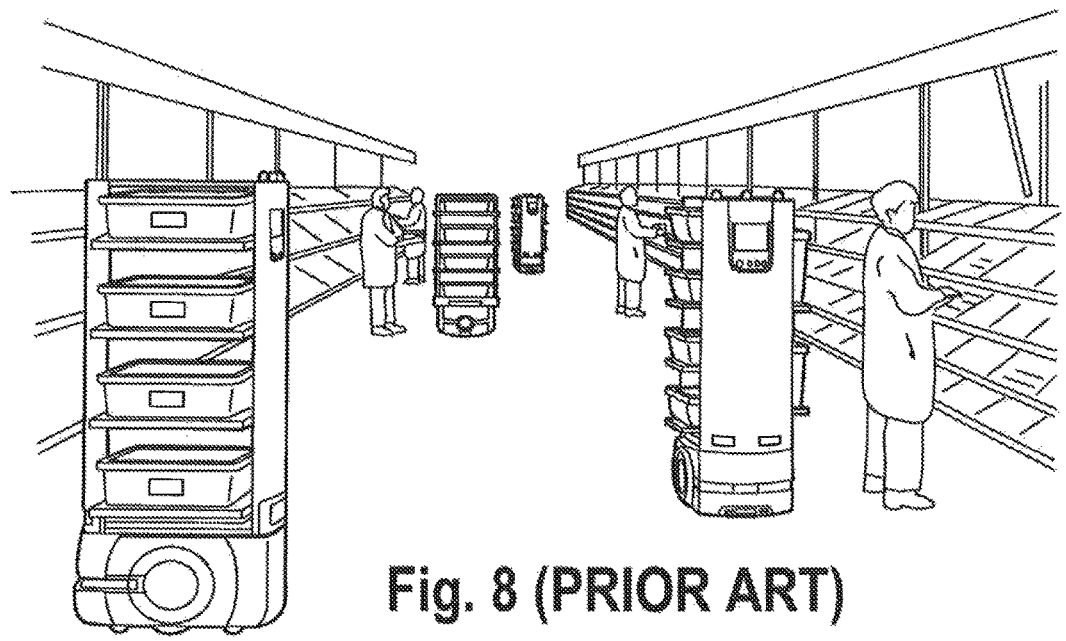
FIG. 8 shows an illustration from the document WO 2015/035300.
Figure 13:
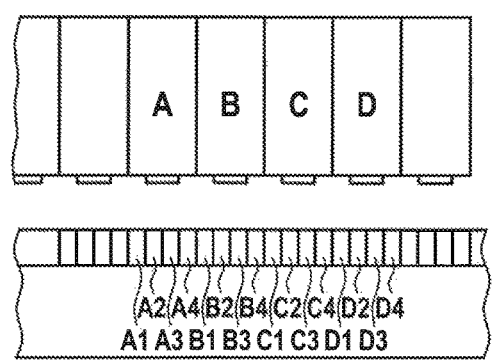
FIGS. 9 to 13 show an illustration of conventional picking methods.
Figure 11:
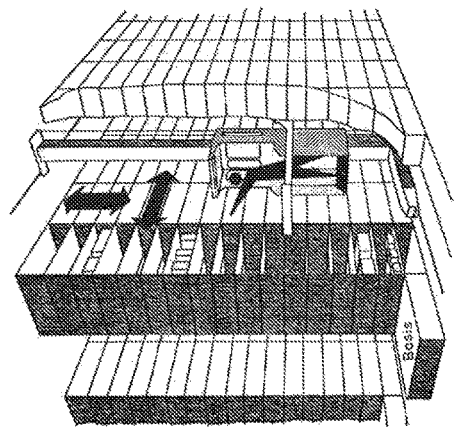
Figure 12:
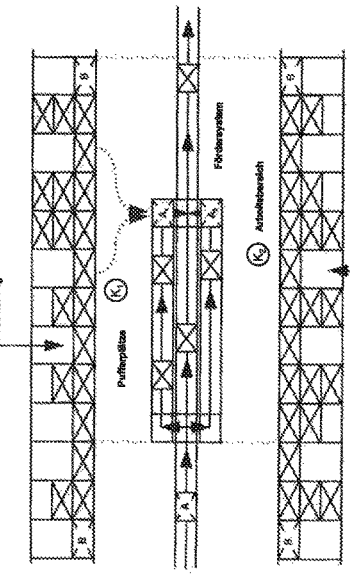
Figure 9:
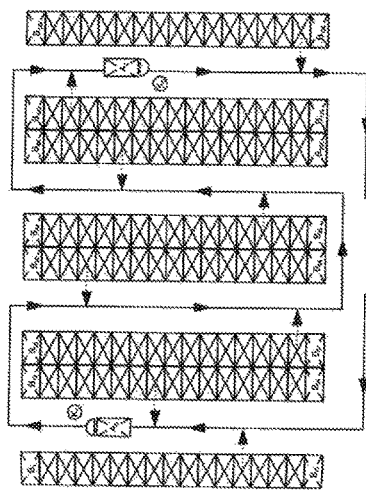
Figure 10:
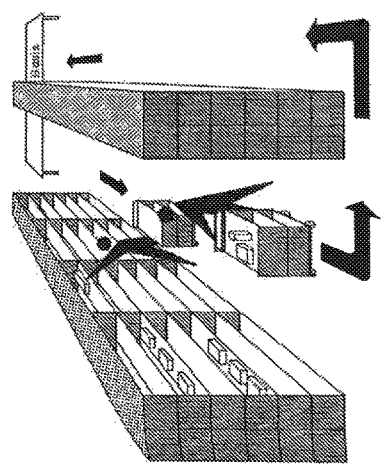

FIG. 7 serves for illustrating a (possible) general distribution/assignment of each of the transfer actions 48. With the analysis of the step S12 in FIG. 5, in particular the sources (picking) or destination locations (storing) in the provision zone(s) 12 are determined. The sources and destination locations in the provision zones 12 of FIG. 7 are represented by differently sized dots. The bigger a dot is the more goods need to be transferred. Each dot represents a location in the provision zone 12 from where goods are removed or where goods are delivered to. Each of these dots in FIG. 7 also represents a retrieval or delivery location. Each of the retrieval/delivery locations in turn determines a corresponding transfer action 48. A direction of the arrows representing the transfer actions 48 in FIG. 7 possibly is not yet set necessarily in the step S12 (cf. transfer action 48-5 in FIG. 6). Nevertheless an action density 78 can be determined. In FIG. 7 the action density 78 is illustrated by a circular area within the action zone 72. This area exemplarily includes three transfer actions 48 which can be performed or need to be performed by the manipulator 40 within the action zone 72.

Now, for the purpose of a work-load optimization for each of the manipulators 40, which are present in large numbers, transfer actions 48 are selected such that each of the manipulators 40 (in average) is preferably given a workload to an equal extent. The work load can be measured, for example, by the number of transfer actions 48 per walking meter of the manipulator 40 along the picking zone 14. Thus, each of the manipulators 40 gets assigned a sub quantity of the transfer actions 48. The DTVs 20 in turn ensure that selected or potential transfer locations 46 are prepared in time for the performance of a respective action order. The corresponding transport orders for the DTVs can also be calculated in dependence on a respective current location of the respective manipulator 40 by means of the controlling device 32.

| LIST OF REFERENCE NUMERALS | |
|---|---|
| 10 | Storage and order-picking system |
| 12 | Provision zone |
| 14 | Picking zone |
| 16 | Goods receipt (WE) |
| 18 | Driverless transport system/DTS |
| 20 | Driverless transport vehicle/DTV |
| 22 | Material flow (flow of goods) |
| 24 | Consolidation station |
| 26 | Packing stations |
| 28 | Shipping area/goods issue (WA) |
| 30 | Customer |
| 32 | Controlling device |
| 34 | Lines |
| 36 | Wireless connection |
| 38 | (Picking) orders |
| 40 | Manipulator |
| 42 | Case |
| 44 | Pallets |
| 46 | Transfer location |
| 48 | Transfer action |
| 50 | Traveling paths |
| 51, 53 | Transport direction |
| 52 | Row of 46 |
| 54 | Rack arrangement |
| 56 | Rack |
| 58 | Rack compartment |
| 60 | Order container |
| 62 | Storage container |
| 64 | Barcode |
| 66 | Number |
| 68 | Lamp |
| 70 | Method |
| 72 | Action zone |
| 74 | Moving path |
| 76 | Starting point |
| 78 | Action density |

The invention claimed is:

1. A method for operating a storage and order-picking system, the system comprising a plurality of manipulators for processing a plurality of picking/storing orders in a manipulator-to-handling-unit operation, wherein in said system humans and/or machine are employed, the system comprising:
a provision zone,
a picking zone adjacent to the provision zone,
a plurality of provision units in the provision zone,
a plurality of stationary transfer locations arranged in the picking zone,
a DTS including a plurality of DTVs, and
a controlling device,
wherein the transfer locations respectively comprise a frame on which handling units are deposited for retrieval or delivery by the DTVs, the method comprising the steps of:
analyzing the plurality of picking/storing orders to determine retrieval/delivery locations in the provision zone by the controlling device;
setting transfer actions by selecting, for each of the retrieval/delivery locations, at least one of the transfer locations in the picking zone as a delivery/retrieval location in the picking zone, and by assigning the delivery/retrieval location to the retrieval/delivery location in the provision zone,
wherein the delivery/retrieval location is located within an action zone extending around the respective retrieval/delivery location in the provision zone, said action zone moving dynamically with the respective manipulator,
wherein each of the transfer actions further defines a number and type of the handling units to be transferred by the respective manipulator between the delivery/retrieval location and retrieval/delivery location assigned to each other;
generating an action order for each of the manipulators by:
selecting some of the transfer actions; and
setting a moving path along which the respective manipulator moves between the selected retrieval/delivery locations in the provision zone through the picking zone;
and generating transport orders for the DTVs so that each of the manipulators can perform its transfer actions within its action zone during performance of its action orders, said DTVs prepare the corresponding selected transfer locations within the action zone and/or downstream of the action zone in time.

2. The method of claim 1, wherein the generating of the action orders is performed in a work-load optimized manner by selecting the corresponding transfer actions such that an action density is adjusted to a work load, wherein the work load represents a preset number of transfer actions per standard length of a picking zone, and the action density represents a manipulator-specific, location-dependent number of the selected transfer actions per standard length of a picking zone.

3. The method of claim 1, wherein the generating of transport orders for the DTVs is performed such that the DTVs prepare the corresponding transfer locations within the action zone and/or downstream of the action zone for the respective transfer actions in time.

4. The method of claim 1, wherein each of the action zones comprises an adjustable dimension that can be fixed after adjustment.

5. The method of claim 1, wherein an entirety of all transfer actions corresponds to the plurality of picking/storing orders.

6. The method of claim 1, wherein an average work load for each of the manipulators is substantially equal.

7. The method of claim 1, wherein the step of analyzing the plurality of picking/storing orders is based on a distribution of the handling units in the provision zone and/or a structure of the picking/storing orders.

8. The method of claim 1, wherein the generation of the transport orders is dependent on a current location of the respective manipulator within the system in real time.

9. The method of claim 1, wherein each of the transfer locations is selectable multiple times in a temporarily-shifted manner.

10. The method of claim 1, wherein the transport orders are generated such that the handling units arrive in a sequenced manner and/or in a sorted manner at the respective destination location.

11. The method of claim 1, wherein each of the DTVs and each of the transfer locations is assigned an unambiguous identification, wherein the controlling device is configured to track a path of each of the handling units through the system exclusively based on the transport orders and confirmation information using the identifications of the transfer locations and the DTVs.

12. The method of claim 1,
wherein the moving path along which the respective manipulator moves between the selected retrieval/delivery locations in the provision zone through the picking zone is a unidirectional moving path, and the respective manipulator moves through the entire picking zone; and wherein each of the manipulators can perform its transfer actions within its action zone during performance of its action orders without interruption.

13. A storage and order-picking system comprising a plurality of manipulators for processing a plurality of picking/storing orders using a manipulator-to-goods-principle, wherein the system comprises:
    a provision zone;
    a picking zone adjacent to the provision zone and extending along the provision zone;
    a plurality of provision units arranged in the provision zone next to each other and/or on top of each other, wherein each of the provision units comprises at least one handling unit;
    a plurality of stationary transfer locations arranged in the picking zone, said transfer locations are arranged along the provision zone, and
    each of the transfer locations is configured to receive and buffer one of the handling units, wherein the transfer locations respectively comprise a frame on which the handling units are deposited for retrieval or delivery by the DTVs;
    a driverless transport system comprising a plurality of driverless transport vehicles, wherein the DTVs and the transfer locations are configured to exchange the handling units with each other, said DTVs are movable autonomously; and
    a controlling device being configured to:
        analyze the plurality of picking/storing orders for determining retrieval/delivery locations in the provision zone;
        set transfer actions by selecting, for each of the retrieval/delivery locations in the provision zone, at least one of the transfer locations in the picking zone as a delivery/retrieval location in the picking zone, and by assigning the delivery/retrieval location to the retrieval/delivery location in the provision zone,
        wherein the delivery/retrieval location is located within an action zone extending around the respective retrieval/delivery location, said action zone moving dynamically with the respective manipulator, and
        wherein each of the transfer actions further defines a number and type of the handling units to be transferred by the respective manipulator between the delivery/retrieval location and retrieval/delivery location assigned to each other;
        generate action orders for each of the manipulators by:
        selecting some of the transfer actions; and
        setting a moving path along which the respective manipulator moves between the selected retrieval/delivery location in the provision zone through the picking zone; and
        generating transport orders for the DTVs so that each of the manipulators can perform its transfer actions within its action zone during performance of its action order, the DTVs preparing the corresponding selected transfer locations within the action zone and/or downstream of the action zone in time.

14. The system of claim 13, wherein the handling units arrive at respective destination location by using the DTVs without tracking.

15. The system of claim 13, wherein at least 50% of an entire length of the provision zone is provided with the transfer locations.

16. The system of claim 13, wherein the transport of the handling units from and to the transfer locations is performed exclusively by the DTVs.

17. The system of claim 13,
    wherein the plurality of stationary transfer locations arranged in the picking zone are arranged continuously along the provision zone; and
    wherein the DTVs and the transfer locations are configured to exchange the handling units with each other in a passive and a bidirectionally meshing manner.

18. The system of claim 13,
    wherein the controlling device is configured to generate the action orders for each of the manipulators in a work-load optimized manner.

19. The system of claim 13,
    wherein the selecting some of the transfer actions is performed such that an action density and a work load are adjusted to each other, wherein the work load represents a desired number of transfer actions per standard length of a picking zone, and wherein the action density represents a location-dependent number of the selected transfer actions per standard length of a picking zone.

20. The system of claim 13,
    wherein the moving path along which the respective manipulator moves between the selected retrieval/delivery locations in the provision zone through the picking zone is a unidirectional moving path, and the respective manipulator moves through the entire picking zone; and
    wherein each of the manipulators can perform its transfer actions within its action zone during performance of its action orders without interruption.

21. The system of claim 13, wherein 60-70% of an entire length of the provision zone is provided with the transfer locations.

* * * * *